United States Patent [19]

Fowler

[11] 4,425,716

[45] Jan. 17, 1984

[54] FLOATING NON-GIMBALLED COMPASS

[75] Inventor: John T. Fowler, Marblehead, Mass.

[73] Assignee: The Laitram Corporation, New Orleans, La.

[21] Appl. No.: 292,351

[22] Filed: Aug. 13, 1981

[51] Int. Cl.³ .............................................. G01C 17/26
[52] U.S. Cl. ................................. 33/355 R; 33/363 K
[58] Field of Search ................. 33/355 R, 363 K, 364, 33/358, 361

[56] References Cited

U.S. PATENT DOCUMENTS

| | | | |
|---|---|---|---|
| 1,294,710 | 2/1919 | Roland | 33/364 X |
| 1,957,897 | 5/1934 | Micek | 33/396 |
| 2,506,353 | 5/1950 | Finneran et al. | 33/364 X |
| 3,888,016 | 6/1975 | Fowler | 33/363 K X |
| 4,027,398 | 6/1977 | Fowler et al. | 33/364 X |

Primary Examiner—Harry N. Haroian
Attorney, Agent, or Firm—Weingarten, Schurgin, Gagnebin & Hayes

[57] ABSTRACT

A remote-reading compass in which a compass assembly is buoyantly supported within a housing to accommodate a large range of tilt. Buoyancy is provided by a float surrounding the compass assembly and a liquid within the housing chamber. A pivot pin extends from either side of the float along a first normally horizontal axis to permit rotation of the float and compass assembly about the axis. The ends of the pivot pin ride in a circumferentially extending track which is disposed on the interior of the housing. The track permits rotation of the compass assembly and float about a second normally horizontal axis orthogonal to the first axis of the pivot pin. In this manner, the compass assembly is permitted to remain in a normally horizontal orientation during movement of the compass housing without need of gimbals, and rotation about a normally vertical axis is prevented. In addition, the track and the pivot pin together maintain a desired spacing between the float and the interior of the housing. The compass assembly typically includes either a flux gate or a coded compass disc and magnet rotatable about a normally vertical axis, and a light source and light sensors for providing a coded output signal representing compass heading.

19 Claims, 5 Drawing Figures

FLOATING NON-GIMBALLED COMPASS

FIELD OF THE INVENTION

This invention relates generally to compasses and more particularly to a remote-reading magnetic compass having a pivotally mounted compass assembly buoyantly supported in a liquid.

BACKGROUND OF THE INVENTION

In many remote-reading magnetic compasses, a plurality of digital signals are provided which are representative of compass position and which can be employed to energize a digital display or other utilization apparatus, such as a servomechanism or automatic pilot. The compass assembly is mounted for rotation on a suitable bearing structure and is supported by gimbals operative to maintain substantially horizontal disposition of the compass assembly in the presence of external forces caused, for example, by rolling and pitching motions of a ship or other vessel or body on which the compass is mounted. One such compass is shown in U.S. Pat. No. 3,888,016 in which the compass rotor takes the form of a code element, such as an optically sensible disc encoded in a plurality of concentric tracks each having a number of alternately light-responsive and non-responsive segments thereto. The compass disc is sensed by an associated array of photosensors. The code element is mounted for rotation in association with one or more magnets within an enclosure fluid with a damping fluid, and this enclosure is supported within a liquid-filled housing by means of an internal gimbal assembly. Other examples of internally gimballed compasses are shown in U.S. Pat. Nos. 3,746,842; 3,833,901; 3,927,474; and 4,047,168. An example of a single pivot, non-gimballed compass is shown in U.S. Pat. No. 4,027,398.

In the above-referenced internally gimballed compasses, the gimbal mechanism for supporting the compass assembly, although providing satisfactory performance, renders the compass somewhat more expensive and complex than is desired for many applications. In the non-gimballed compass referred to above, the range of tilt permitted is not as great as needed in many marine vessels or in other compass applications.

SUMMARY OF THE INVENTION

The present invention provides a remote reading magnetic compass of relatively simple and low cost construction and having a high range of permissible tilt. This novel compass includes a compass assembly which is buoyantly supported within a housing by means of a float surrounding the compass assembly and a liquid within the housing chamber. A pivot pin extends through the float, and the ends thereof project from either side of the float to permit rotation of the float and compass assembly about a first normally horizontal axis. The ends of the pivot pin ride in a circumferentially extending track which is disposed on the interior of the housing to permit rotation of the compass assembly and float about a second normally horizontal axis orthogonal to the first axis of the pivot pin. In this manner, the compass disc assembly is permitted to remain in a normally horizontal orientation during movement of the compass housing through a large range of tilt without need of gimbals. In addition, the desired spacing between the float and the interior of the housing is maintained by the positioning of the ends of the pivot pin within the track, and rotation of the compass assembly about a normally vertical axis is prevented. The compass assembly may include a coded compass disc and magnet rotatable about the normally vertical axis, and a light source and light sensors for providing a coded output signal representing compass heading. Any other remote reading compass assembly such as a flux gate may alternatively be employed.

DESCRIPTION OF THE DRAWING

The invention will be more fully understood from the following detailed description taken in conjunction with the accompanying drawing in which:

FIG. 5 is a partial cutaway view of one embodiment of the pivot pin of the compass of FIG. 1.

DETAILED DESCRIPTION OF THE INVENTION

Figure 1:
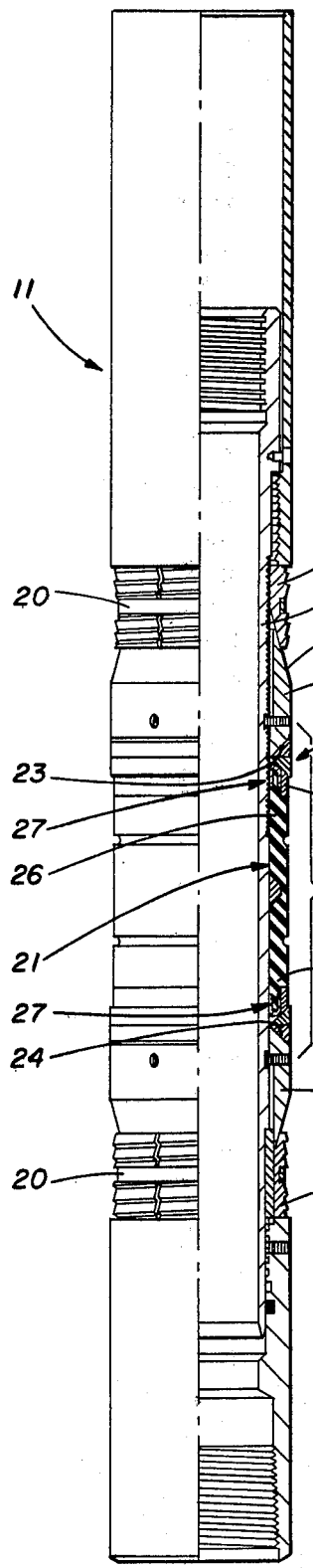
FIG. 1 is a partially cutaway pictorial view of a compass according to the invention.
Figure 2:
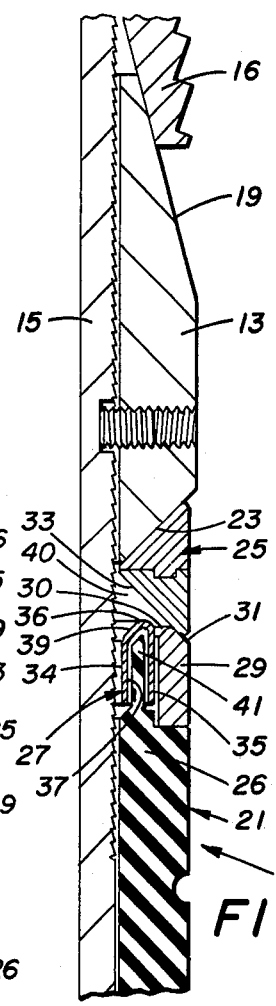
FIG. 2 is a sectional elevation view of the digital compass of this invention taken along line 2—2 of FIG. 1.
Figure 3:
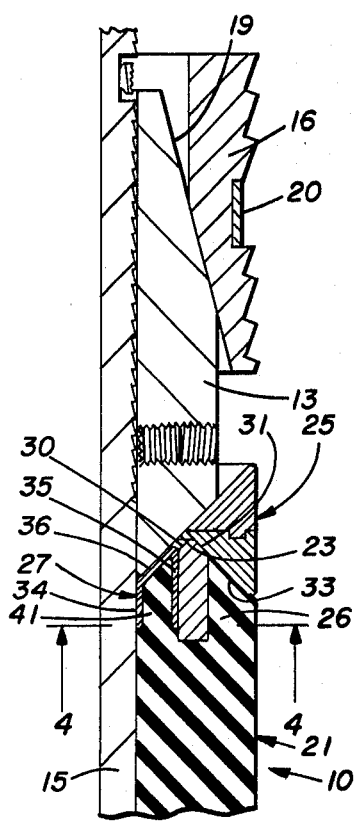
FIG. 3 is a sectional elevation view of the digital compass of this invention taken along the line 3—3 of FIG. 1.

A digital compass constructed and operative according to the invention is shown in FIGS. 1, 2 and 3 and includes a housing 10 which is typically spherical and is formed of an upper hemisphere 12 and a lower hemisphere 14. The confronting edges of the upper and lower hemispheres 12 and 14 terminate in respective flanges 16 and 18 which mate to seal the housing. Hemispheres 12 and 14 are secured together by fasteners 20 provided through openings in flanges 16 and 18. An O-ring 22 or other suitable sealing element can be provided between flanges 16 and 18 around the periphery thereof to prevent leakage of a liquid 34 contained within the housing 10. Housing 10 may also have any other shape desired, such as a cube, parallelopiped or cylinder.

A compass assembly 30 is pivotally mounted and buoyantly supported within the central region of housing 10. Buoyancy is provided by a float 32 which is partially submerged in liquid 34 which has an upper level 35. An aperture 45 is provided in upper surface 42 of float 32 for insertion of compass assembly 30 within float 32 at a position spaced below upper surface 42. Extending through float 32 along a first normally horizontal axis 91 is a pivot pin 36 about which float 32 and assembly 30 are free to rotate. Pin 36 is secured to float 32, while each end thereof extends into and rides along an associated segment of groove 40 in a track 38. The ends of pin 36 are free to rotate and ride within track 38. Track 38 extends around a circumference of the interior of housing 10 and permits each end of pin 36 to ride in opposed relation with the other end in its associated groove segments upwardly along a portion of groove 40 in upper hemisphere 12 or downwardly along a portion of groove 40 in lower hemisphere 14. In this manner, compass assembly 30 and float 32 are also permitted to rotate about a second normally horizontal axis 93 generally perpendicular to axis 91. Compass assembly 30 and float 32 thus rotate about axes 91 and 93 in response to changes in orientation of housing 10 to maintain compass assembly 30 in a fixed relation with respect to upper level 35, which in most applications is horizontal. Groove 40 laterally restrains pin 36 to prevent any movement of compass assembly 30 about a normally vertical axis 85 without impeding the rotation of pin 36 about axis 91. Pin 36 typically passes through a lip 37 projecting upwardly away from assembly 30, although pin 36 could pass through float 32 at any convenient point above the center of gravity 97 of compass assembly 30. A central section 39 of pin 36 has a rectangular cross-section and rests in abutting relation with layer 143 of assembly 30 to prevent rotation of pin 36 with respect to compass assembly 30 and float 32. At least one drainage slot 84 is provided in aperture 45 adjacent layer 143 of compass assembly 30 to prevent the accumulation of liquid 34 within aperture 45 which would weight compass assembly 30 downwardly.

Typically, float 32 has a flat upper surface 42 and a lower rounded portion 56 which conforms to the interior shape of housing 10 such that portion 56 will not strike the housing as float 32 pivots. Float 32 is symmetrically formed along each axis 91 and 93 about respective orthogonal axes 93 and 91. Also, most of the mass of float 32 is disposed in lip 37 and other portions of float 32 which extend above the center of gravity 97 of compass assembly 30, which resides on or near axis 85. Thus, the buoyant forces provided by float 32 are applied along a generally symmetrical locus spaced from vertical axis 85 and above the center of gravity 97 of compass assembly 30. The compass assembly 30 thus is a pendulous mass suspended below the center of buoyancy of a buoyant locus in liquid 34. This configuration produces a stable body which pivots about axes 91 and 93 quickly in response to changes in orientation of the liquid level 35, but whose motion is damped to prevent overreacting. Float 32 is typically provided with a slightly positive buoyancy and the liquid is filled to a level 35 sufficient to raise float 32 to a desired position with respect to housing 10. Typically, liquid level 35 is disposed at about the center of housing 10 to permit accommodation of thermal expansion or contraction of the liquid.

The segments of grooves 40 of track 38 need not extend around the entire circumference of the interior of housing 10, but may extend only sufficiently far to accommodate the normally expected tilt from the horizontal experienced in a typical marine vessel or other apparatus in which the compass is employed. Each segment of groove 40 typically encompasses an arc of 45° and thereby permits float 32 to rotate about axis 93 in an arc of plus or minus 45°. Pivot pin 36 is sufficiently long to space float 32 from track 38 and from the interior surfaces of housing 10. Float 32 may be truncated perpendicular to axis 91, as shown in FIG. 1, rather than being entirely circular in cross section to accommodate pivot pin 36 and track 38. However, as previously indicated, the radial extent of the truncation must be the same on opposite sides of float 32 to provide the necessary symmetry. Since pivot pin 36 is laterally and longitudinally restrained within track 38, the spacing of float 32 from the interior surfaces of the housing is maintained in all directions. As a result, movement of float 32 and compass assembly 30 about axes 91 and 93 is unimpeded by the housing.

Typically the ends of pivot pin 36 do not fit tightly within grooves 40, but are spaced slightly at their ends and along their sides to reduce friction and to accommodate thermal expansion and changes in liquid level 35 due to temperature fluctuations. Also, the ends of pin 36 may be provided with reduced diameter and a taper, as shown in FIG. 5, to accommodate a lesser width of groove 40 to reduce friction caused by the rotation thereof. The ends of pivot pin 36 also may be provided with shock absorbing springs 88, as shown in FIG. 5, to protect compass assembly 30 from damage if housing 12 should be dropped or otherwise suffer a concussion.

Connection is made to the compass assembly electronics by means of a cable 50 which terminates in a junction box 60 in the upper portion of housing 10. A cover 58 encloses junction box 60 which includes terminal posts 62, each having an upper portion within the junction box for connection to respective wires 64 of cable 50, and a lower portion within hemisphere 12 to which connecting wires 66 are coupled from plug 141. The interconnecting wires can be braided together and are arranged in a path to provide slack sufficient to not impede the tilting of compass assembly 30 and float 32.

Figure 4:
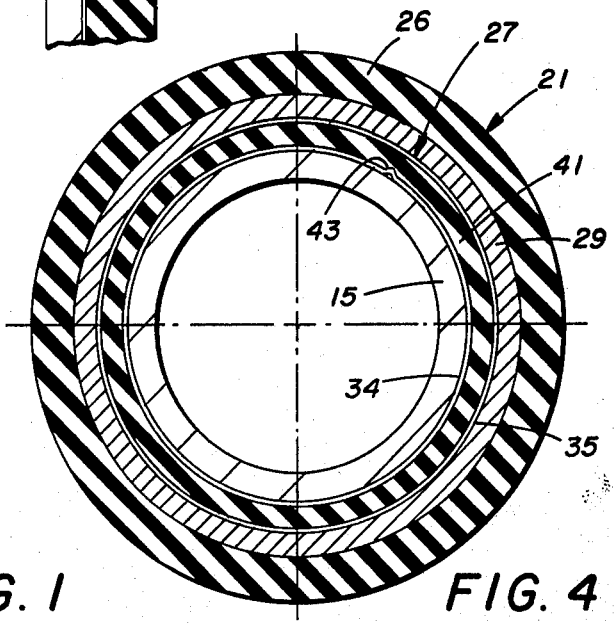
FIG. 4 is a cutaway pictorial view of one embodiment a compass assembly employed in the embodiment of FIGS. 1, 2 and 3.

The compass assembly 30 may be similar to the single pivot remote reading compass as shown in FIG. 4 and as described in U.S. Pat. No. 4,027,398, assigned to the assignee of the present invention, or it may be any other remote reading assembly known to those skilled in the art, such as a flux gate. With reference to FIG. 4, one embodiment of compass assembly 30 includes a generally cylindrical enclosure or housing 110 having a cylindrical outer wall 112, an upper wall 114 and a lower wall 115. Housing 10 forms a sealed enclosure which is filled with and contains a damping liquid 117. Housing 110 is formed of a non-magnetic material which typically is a plastic such as Lexan. Lower wall 115 preferably is formed of a tightly stretched, flexible rubber diaphragm which can accommodate expansion and contraction of liquid 117 with changes in the ambient pressure. Lower wall 115 is secured to cylindrical wall 112 and tightly stretched by a circular retainer ring 121 which captures the circular perimeter of the diaphragm between ring 121 and wall 112 to hold it in place and to apply the proper tension thereto. A compass disc 116 is disposed within enclosure 110 and is supported for rotation about a normally vertical axis defined by a single pivot assembly which includes a pivot pin 118 upwardly extending from the center of disc 116 and a cooperative bearing 120 affixed to upper wall 114 of housing 110. Housing 110 can be dimensioned to retain disc 116 in mounting relation to the pivot assembly so that the pivot pin cannot unintentionally be removed from bearing 120. The pin 118 is affixed to a hub 122 which is secured to disc 116 and which has depending downwardly therefrom a shaft 124 at the lower end of which is affixed a cylindrical magnet 126. The shaft 124 and hub 122 are typically formed of brass while pivot pin 118 is of stainless steel. The bearing 120 is typically a jeweled cup bearing.

The disc 116 and its associated structure, namely pin 118, hub 122, shaft 124 and magnet 126 are of a weight less than the displaced weight of the damping liquid 117 within housing 110 such that the disc is buoyantly disposed within the damping liquid. The disc is maintained by the single pivot assembly at a level below its normal buoyant level to provide a predetermined bearing force between pivot pin 118 and associated bearing 120. The disc is freely rotatable about the normally vertical axis and is tiltable from the normally horizontal axis by a selected amount by action of the single pivot assembly without any need for gimbal mounting. The bearing 120 is configured with respect to pin 118 to permit relative tilting of housing 110 with respect to disc 116 by an amount determined by the geometry of the bearing assembly and the compass structure. Typically, about plus or minus 6° of tilt is provided without affecting the accuracy of the photoelectric sensing of disc 116. The magnet 126 is disposed below the plane of disc 116 such that the center of gravity is below the center of buoyancy for the compass disc and its associated components. The disc assembly tends to remain in a normally horizontal disposition by virtue of the low center of gravity, with the result that the static tilt of the disc is compensated without need for counterweights on the disc.

Secured to wall 112 and disposed immediately below compass disc 116 is a circuit board 131. Circuit board 131 is provided with a centrally disposed aperture 133 through which shaft 124 projects and through which liquid 117 is permitted to pass so that the liquid pressure on either side of circuit board 131 is at all times equal. Compass disc 116 is positioned at all times between upper wall 114 and circuit board 131.

Compass disc 116 includes a plurality of concentric tracks 128 disposed on a surface thereof and defining coded representations of compass heading. A photosensor array 130 is affixed to upper wall 114 of enclosure 10 in a position to sense the respective tracks 28 of the compass disc. An illumination source 132, such as a light-emitting diode, is disposed on circuit board 131 on the opposite side of disc 116 from sensor array 130 to provide illumination of coded tracks which are sensed by the photosensor array in accordance with the particular angular position of disc 116 with respect to the array. The photosensor array 130 provides a plurality of output signals digitally coded to represent compass heading, and these output signals can be processed in any suitable manner to provide an output indication of compass heading. The output signals from the photosensor array 130 are transmitted to an input/output plug 141 and then to wires 66 connected thereto and then to junction box 60 for remote storage, display or other intended use of the compass heading. Plug 141 is typically embedded in a layer of epoxy 143 which is disposed on upper wall 114 and which is laterally bounded by upwardly projecting portions 145 of cylindrical wall 112. Plug 141 is a dual-in-line female connector.

Lower hemisphere 14 of housing 10 may be disposed within a cylindrical support and secured thereto by fasteners to provide a convenient base structure for mounting the compass for use in a marine vessel or other body in which it is to be employed as, for example, as shown in U.S. Pat. No. 3,888,016. Hemisphere 14 may also be secured to a marine vessel by a bracket or any other known means of mounting. When in use, in a typical environment aboard a ship, compass housing 10 is installed at any suitable position in the vessel with the sensor array aligned along or parallel to the longitudinal axis of the vessel. The display of compass heading is usually provided at a position remote from the compass structure itself, since the electrical output signals can be transmitted readily to remote locations. Since the compass rotor is not visually viewed, the compass structure can be mounted at various locations which would be unsuitable for conventional visually readable compasses. The compass can, for example, be located in the hold of a ship or even at locations at which rolling, pitching and yawing motions are exaggerated since the compass assembly is highly responsive to movements of the housing and is also somewhat damped by the fluid to prevent overreaction to the pitching and yawing and is always maintained in an essentially normally horizontal position. The multiple bit signals provided by the photosensor array are processed by associated logic circuitry to provide output signals representative of compass position, and these output signals are coupled to post 62 in junction box 60 by wires 66 and thence to cable 50 for transmission to one or more output indicators, such as a multidisplay, or other utilization apparatus such as an autopilot. The code representing compass position can be transmitted in either parallel or serial form to the display, although serial transmission is usually preferred to minimize the number of electrical connections required. More than one output display can be provided for energization by the digital compass of the invention. The logic circuitry is known and can take a variety of forms to suit specific operating requirements.

Housing 10 and hemispheres 12 and 14 may be composed of any suitable material and may be either transparent or opaque, since the compass is designed for remote reading. Typically, housing 10 is formed of a plastic material such as a polycarbonate, for example Lexan. Track 38 is generally formed of the same material as housing 10 although, again, any suitable non-corrosive material may be used. Float 32 must be composed of a buoyant material, and typically foamed polyvinyl chloride is employed. Liquid 34 is preferably an oil such as silicone oil, although water or any other similar fluid may be used. Pivot pin 36 and track 38 preferably are formed of a material having a low coefficient of friction so that pin 36 will easily slide within track 38. A typical material for track 38 is Lexan, while pin 36 is typically Delrin. The tolerances provided between pin 36 and groove 40 of track 38 need only be sufficient to prevent pin 36 from popping out of grooves 40 and to prevent float 32 from bumping into the interior of housing 10.

It will be appreciated that various modifications and alternative implementations of the invention can be provided without departing from the spirit and true scope thereof. Accordingly, it is not intended to limit the invention by what has been particularly shown and described except as indicated in the appended claims.

What is claimed is:

1. A remote-reading magnetic compass comprising:
 a housing partially filled with a liquid;
 a remote-reading compass assembly disposed within said housing and operative to provide electrical signals indicative of compass heading;
 a float of a solid buoyant material surrounding said compass assembly for providing buoyancy to said compass assembly in said liquid and for biasing said compass assembly into a generally horizontal orientation, said float being generally symmetrically disposed about said compass assembly along a first horizontal axis and along a second horizontal axis orthogonal to said first horizontal axis;
 a pivot rod extending through said float along said first horizontal axis for permitting rotation of said compass assembly about said first horizontal axis, said pivot rod having a pair of ends extending from opposite sides of said float; and
 a track circumferentially disposed about the interior of said housing and having said pair of pivot rod ends riding therein in opposed, confronting sections of said track, said track permitting said compass assembly to rotate about said second horizontal axis over a predetermined arc and preventing rotation of said compass assembly about a vertical axis orthogonal to said first and said second horizontal axes, said track and said pivot rod together permitting said compass assembly to remain in a generally horizontal orientation under the buoyant influence of said float.

2. The remote-reading compass of claim 1 wherein said housing has a generally spherical shape, and is formed of two hemispheres which are secured together along a circumferentially extending pair of outwardly projecting flanges.

3. The remote-reading compass of claim 1 wherein said liquid comprises an oil.

4. A remote-reading magnetic compass comprising:
a housing partially filled with liquid, said liquid having an upper level;
a remote-reading compass assembly disposed within said housing and operative to provide electrical output signals representative of compass heading;
a substantially annular float of said buoyant material having an interior sized to receive said compass assembly;
said annular float having an interior cylindrical surface and an exterior substantially cylindrical surface;
said float surrounding said compass assembly to provide buoyancy to said compass assembly in said liquid and for biasing said compass assembly into a generally horizontal orientation, said float being generally symmetrically disposed about said compass assembly along a first horizontal axis and along a second horizontal axis perpendicular to said first horizontal axis and defining a cavity within said annular float above said compass assembly;
means for drainage of said liquid from said cavity within said float upon accumulation of said liquid therein;
a pivot rod extending through said float along said first horizontal axis for permitting rotation of said compass assembly about said first horizontal axis, a pair of pivot pins extending from said pivot rod on opposing sides of said float; and
a track circumferentially disposed about the interior of said housing and having said pair of pivot pins riding therein in opposed, confronting sections of said track, said track permitting said compass assembly to rotate about said second horizontal axis over a predetermined arc and preventing rotation of said compass assembly about a vertical axis orthogonal to said first and second horizontal axes, said track and said pivot pins together permitting said compass assembly to remain in a generally horizontal orientation under the buoyant influence of said float.

5. The remote-reading compass of claim 1 wherein the float has a lower portion which is tapered to substantially conform in shape to a portion of the interior surface of said housing.

6. The remote-reading compass of claim 4 wherein said housing has a generally spherical shape, and is formed of two hemispheres which are secured together along a circumferentially extending pair of outwardly projecting flanges.

7. The remote-reading compass of claim 4 wherein said liquid comprises an oil.

8. The remote-reading compass of claim 4 wherein the annular float has a lower portion which is tapered and substantially conforms in shape to a portion of the interior surface of said housing.

9. The remote-reading compass of claim 4 wherein said drainage means comprises at least one passage downwardly sloping through said annular float from a point above said upper level on said interior cylindrical surface to said exterior surface.

10. A remote-reading magnetic compass comprising:
a housing partially filled with a liquid;
a remote-reading compass assembly disposed within said housing and operative to provide electrical signals representative of compass heading;
an annular float of solid buoyant material having an interior bore sized to receive said compass assembly;
said compass assembly disposed within said bore of said float, said float providing buoyancy for said compass assembly in said liquid and biasing said compass assembly into a generally horizontal orientation, said float being generally symmetrically disposed about said compass assembly along a first horizontal axis and along a second horizontal axis perpendicular to said first horizontal axis and defining a cavity within said bore above said compass assembly and having a pivot rod extending through said float and disposed along said first horizontal axis for permitting rotation of said compass assembly about said first horizontal axis;
projecting pivot pins disposed respectively within each end of the pivot rod;
shock absorbing means within said pivot rod ends to absorb and prevent transfer of shock from said housing to said compass assembly through respective projecting pivot pins and the pivot rod;
means for liquid drainage from said cavity to prevent accumulation of said liquid within said cavity thereby maintaining said float in said generally horizontal orientation; and
a track circumferentially disposed about the interior of said housing and having said projecting pivot pins riding therein in opposed, confronting sections of said track, said track permitting said compass assembly to rotate about said second horizontal axis over a predetermined arc and preventing rotation of said compass assembly about a vertical axis orthogonal to said first and second horizontal axes, said track and said pivot rod pins together permitting the compass assembly to remain in a generally horizontal orientation under the buoyant influence of said float.

11. The magnetic compass of claim 10 wherein said shock absorbing means comprises a spring disposed in compression within each end of the pivot rod, between the pivot rod and the respective projecting pin, said springs operative to minimize the transfer of shock from said housing to said compass assembly.

12. A remote-reading magnetic compass comprising:
a first housing partially filled with a liquid to a predetermined level;
a remote-reading compass assembly disposed within said housing and operative to provide electrical signals representative of compass heading;
an annular float of solid buoyant material having a bore sized to receive said compass assembly;
said float surrounding said compass assembly to provide buoyancy to said compass assembly in said liquid and for biasing said compass assembly into a generally horizontal orientation, said float being generally symmetrically disposed about said compass assembly along a first horizontal axis and along a second horizontal axis perpendicular to said first horizontal axis and defining a cavity within said bore above said compass assembly;

said compass assembly including;

a second housing filled with a damping fluid;

a rotatable assembly disposed within said housing, said rotatable assembly comprising:

a disc having coded representations of compass headings provided on a surface thereof and being buoyantly supported in said damping fluid;

a single pivot bearing coupling said disc to an upper portion of said second housing and providing rotation of said disc about a third axis normally orthogonal to said first and second axes; and magnet means disposed within said disc and spaced therefrom and affixed to said disc for rotation therewith;

said rotatable assembly being buoyant with respect to said damping fluid and supported by said single pivot bearing at a level in said damping fluid below the normal level of buoyancy and having a center of gravity below the center of buoyancy to maintain said compass disc in an intended disposition;

said single pivot bearing being constructed to permit tilting of said second housing with respect to said first and second axes by a selected amount; and means in said second housing for photoelectrically sensing the coded representation on said disc to provide electrical output signals representative of compass heading; and means for providing damping liquid drainage upon accumulation in said cavity to permit maintenance of said float and compass assembly in a generally horizontal orientation;

a pivot rod having ends extending through said float and disposed along said first horizontal axis for permitting rotation of said compass assembly about said first horizontal axis;

a pair of pivot pins extending from opposite ends of said pivot rod;

means for minimizing transference of shock from said housing through respective pivot pins to said pivot rod and to said compass assembly;

a track circumferentially disposed about the interior of said housing and having said pair of pivot pins riding therein in opposed, confronting sections of said track, said track permitting said compass assembly to rotate about said second horizontal axis over a predetermined arc and preventing rotation of said compass assembly about a vertical axis orthogonal to said first and second horizontal axes, said track and said pivot pin together permitting said compass assembly to remain in a generally horizontal orientation under the buoyant influence of said float.

13. The magnetic compass of claim 12 wherein said absorbing shock means includes a spring disposed within each end of the pivot rod and captured in compression between each end of the pivot rod and the respective projecting pivot pin portion.

14. The magnetic compass of claim 13 wherein said spring comprises a coil spring.

15. A remote reading magnetic compass comprising:

a housing partially filled with a liquid, said liquid having an upper level;

a remote reading compass assembly having a top surface, said assembly disposed within said housing said operative to provide electrical output signals representative of compass heading;

a substantially annular float of solid buoyant material having an interior first bore sized to receive said compass assembly;

said float surrounding said compass assembly to provide bouyancy to said compass assembly in said liquid and for biasing said compass assembly into a generally horizontal orientation, said float being generally symmetrically disposed about said compass assembly along a first horizontal axis and along a second horizontal axis perpendicular to said first horizontal axis and defining a cavity within said first bore above said compass assembly;

a support affixed to said compass assembly top surface, and having a second bore horizontally disposed through said support;

a pivot rod extending through said float and said second bore in said support along said first horizontal axis for permitting rotation of said compass assembly about said first horizontal axis and maintaining said compass assembly in fixed position within said annular float;

a pair of pivot pins extending from opposite ends of said pivot rod;

a track circumferentially disposed about the interior of said housing and having said pair of pivot pins riding therein in opposed, confronting sections of said track, said track permitting said compass assembly to rotate about said second horizontal axis over a predetermined arc and preventing rotation of said compass assembly about a vertical axis orthogonal to said first and second horizontal axes, said track and said pivot pins together permitting said compass assembly to remain in a generally horizontal orientation under the buoyant influence of said float.

16. The remote reading magnetic compass of claim 15 further including shock absorbing means within said pivot rod ends to absorb and prevent transfer of shock from said housing to said compass assembly through respective projecting pivot pins and said pivot rod.

17. The remote reading compass of claim 16 wherein said shock absorbing means comprises a spring disposed in compression within each respective end of the pivot rod between the pivot rod and the respective projecting pivot pin, said springs operative to minimize the transfer of shock from said housing to said compass assembly.

18. The remote reading magnetic compass of claim 15 further including a passage extending through said annular float from said cavity and providing for drainage of accumulated liquid from said cavity.

19. The remote reading magnetic compass of claim 15 wherein a junction box is provided in the upper portion of said housing for interconnection of electrical conductors from said remote reading compass assembly to utilization apparatus.

* * * * *